United States Patent
Ramesh

(10) Patent No.: US 10,124,415 B2
(45) Date of Patent: Nov. 13, 2018

(54) INDEXABLE DRILL INSERT AND ROTARY CUTTING TOOL EMPLOYING SAME

(71) Applicant: KENNAMETAL INDIA LIMITED, Latrobe, PA (US)

(72) Inventor: Karthic Ramesh, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 378 days.

(21) Appl. No.: 14/762,633

(22) PCT Filed: Jan. 21, 2014

(86) PCT No.: PCT/US2014/012282
§ 371 (c)(1),
(2) Date: Jul. 22, 2015

(87) PCT Pub. No.: WO2014/116571
PCT Pub. Date: Jul. 31, 2014

(65) Prior Publication Data
US 2017/0001248 A1    Jan. 5, 2017

(30) Foreign Application Priority Data
Jan. 23, 2013    (IN) .............................. 315/CHE/2013

(51) Int. Cl.
*B23B 51/04*    (2006.01)
*B23B 27/14*    (2006.01)

(52) U.S. Cl.
CPC .......... *B23B 51/048* (2013.01); *B23B 27/145* (2013.01); *B23B 2200/0442* (2013.01);
(Continued)

(58) Field of Classification Search
CPC ................ B23B 51/048; B23B 27/145; B23B 2251/505; B23B 2200/0442;
(Continued)

(56) References Cited

U.S. PATENT DOCUMENTS 3,497,933 A    3/1970   Okada
4,072,438 A    2/1978   Powers
(Continued)

FOREIGN PATENT DOCUMENTS

CN    1110051 C    5/2003
CN    1655899 A    8/2005
(Continued)

OTHER PUBLICATIONS

May 11, 2016—Second_Office_Action—CN201310174915X (English translation).
(Continued)

*Primary Examiner* — Daniel Howell
*Assistant Examiner* — Paul M Janeski
(74) *Attorney, Agent, or Firm* — Matthew S. Bedsole

(57) ABSTRACT

An insert includes four identical cutting edges disposed at the intersection of top and side surfaces surface. Each cutting edge includes a first part edge disposed tangent to a first reference circle aligned about the central mounting aperture; a second part edge extending from the first part edge, the second part edge being connected to the first part edge via a convex curved portion; a third part edge disposed tangent to a second reference circle aligned about the central mounting aperture, the second reference circle having a smaller diameter than the first reference circle, the third part edge being connected to the second part edge via a concave curved portion; and a convexly curved corner portion extending from the third part edge of one of the identical cutting edges to the first part edge of another one of the identical cutting edges.

16 Claims, 9 Drawing Sheets

(52) U.S. Cl.
CPC ........... *B23B 2200/0471* (2013.01); *B23B 2200/0476* (2013.01); *B23B 2200/202* (2013.01); *B23B 2200/204* (2013.01); *B23B 2251/505* (2013.01)

(58) Field of Classification Search
CPC .... B23B 2200/0476; B23B 2200/0471; B23B 2200/204; B23B 2200/202
See application file for complete search history.

(56) References Cited

U.S. PATENT DOCUMENTS

| | | | |
|---|---|---|---|
| 4,087,917 A | 5/1978 | Sheerer |
| 4,115,024 A | 9/1978 | Sussmuth |
| 4,131,383 A | 12/1978 | Powers |
| 4,189,265 A | 2/1980 | Arnold |
| 4,194,862 A | 3/1980 | Zweekly |
| 4,475,851 A | 10/1984 | Hale |
| 4,507,024 A | 3/1985 | Stashko |
| 4,606,679 A | 8/1986 | Jeremias |
| 4,648,760 A | 3/1987 | Karlsson |
| 4,889,455 A | 12/1989 | Karlsson |
| 4,915,548 A | 4/1990 | Fouquer |
| 4,966,500 A | 10/1990 | Tsujimura |
| 5,032,049 A | 7/1991 | Hessman |
| 5,158,402 A | 10/1992 | Satran |
| 5,221,164 A | 6/1993 | Allaire |
| 5,232,319 A | 8/1993 | Satran |
| 5,302,060 A | 4/1994 | Nystrom |
| 5,340,246 A | 8/1994 | Tukala |
| 5,437,522 A | 8/1995 | Satran |
| 5,486,073 A | 1/1996 | Satran |
| 5,509,761 A | 4/1996 | Grossman |
| 5,593,255 A | 1/1997 | Satran |
| 5,597,271 A | 1/1997 | Men |
| 5,709,509 A | 1/1998 | Wegener |
| 5,720,583 A | 2/1998 | Bohnet |
| 5,727,919 A | 3/1998 | Heumann |
| 5,807,031 A | 9/1998 | Arai |
| 5,895,179 A | 4/1999 | Gschwend |
| 5,947,650 A | 9/1999 | Satran |
| 5,957,635 A | 9/1999 | Nuzzi |
| 5,971,672 A | 10/1999 | Hansson |
| 5,975,812 A | 11/1999 | Friedman |
| 6,019,553 A | 2/2000 | Yakamavich, Jr. |
| 6,039,515 A | 3/2000 | Lamberg |
| 6,200,077 B1 | 3/2001 | Svenningsson |
| 6,257,807 B1 | 7/2001 | Heinloth |
| 6,336,776 B1 | 1/2002 | Noggle |
| 6,527,486 B2 | 3/2003 | Wiman |
| 6,543,970 B1 | 4/2003 | Qvarth |
| 6,712,563 B2 | 3/2004 | Maier |
| 6,733,212 B2 | 5/2004 | Nagaya |
| 6,783,306 B2 | 8/2004 | Popke |
| 6,929,432 B2 | 8/2005 | Roman |
| 6,948,891 B2 | 9/2005 | Roman |
| 7,121,772 B2 | 10/2006 | Krahula |
| 7,175,370 B2 | 2/2007 | Scherbarth |
| 7,192,224 B2 | 3/2007 | Fritsch |
| 7,341,408 B2 | 3/2008 | Kratz |
| 7,351,017 B2 | 4/2008 | Kruszynski |
| 7,374,372 B2 | 5/2008 | Rofner |
| 7,431,540 B2 | 10/2008 | Lof |
| 7,438,508 B2 | 10/2008 | Alm |
| 7,513,717 B2 | 4/2009 | EngstrÄm |
| 7,677,845 B2 | 3/2010 | Limell |
| 7,695,221 B2 | 4/2010 | Kruszynski |
| 7,758,287 B2 | 7/2010 | Alm |
| 7,837,417 B2 | 11/2010 | Blomstedt |
| 7,857,555 B2 | 12/2010 | Wermeister |
| 7,905,687 B2 | 3/2011 | Dufour |
| 7,909,546 B2 | 3/2011 | Nada |
| 7,922,427 B2 | 4/2011 | Spitzenberger |
| 7,972,091 B2 | 7/2011 | Svenningsson |
| 8,157,489 B2 | 4/2012 | Wolf |
| 8,192,113 B2 | 6/2012 | Limell |
| 8,197,163 B2 | 6/2012 | Nasu |
| 2003/0223832 A1 | 12/2003 | Roman et al. |
| 2003/0223833 A1 | 12/2003 | Roman |
| 2005/0111928 A1 | 5/2005 | Stanarius |
| 2007/0160433 A1 | 7/2007 | Lee |
| 2007/0201962 A1 | 8/2007 | Limell |
| 2008/0131217 A1 | 6/2008 | Kruszynski et al. |
| 2009/0071723 A1 | 3/2009 | Mergenthaler |
| 2009/0238649 A1 | 9/2009 | Kruszynski |
| 2009/0245949 A1 | 10/2009 | Takahashi |
| 2010/0178122 A1 | 7/2010 | Bae |
| 2010/0209203 A1 | 8/2010 | Cao |
| 2010/0329804 A1 | 12/2010 | Okumura |
| 2012/0027530 A1 | 2/2012 | Agic |
| 2013/0022422 A1 | 1/2013 | Ramesh |
| 2013/0022423 A1 | 1/2013 | Ramesh |
| 2013/0315684 A1 | 11/2013 | Ramesh |
| 2014/0161552 A1 | 6/2014 | Ramesh |
| 2014/0212235 A1 | 7/2014 | Prast |

FOREIGN PATENT DOCUMENTS

| | | |
|---|---|---|
| CN | 1655900 A | 8/2005 |
| CN | 1671499 A | 9/2005 |
| CN | 1251327 C | 4/2006 |
| CN | 101011754 A | 8/2007 |
| CN | 100571943 C | 12/2009 |
| CN | 101720265 A | 6/2010 |
| CN | 101234432 B | 11/2011 |
| CN | 101668604 B | 2/2012 |
| CN | 101720265 B | 2/2012 |
| CN | 102361719 A | 2/2012 |
| CN | 101437640 B | 3/2012 |
| CN | 102458739 A | 5/2012 |
| CN | 101152671 B | 5/2013 |
| DE | 102006044605 | 3/2008 |
| EP | 1813368 | 8/2007 |
| EP | 1902799 | 3/2008 |
| JP | 59196107 | 12/1984 |
| JP | 10180519 | 7/1998 |
| JP | 11104911 A * | 4/1999 |
| JP | 2000061719 | 2/2000 |
| JP | 2002-066811 A | 3/2002 |
| JP | 2003094222 | 4/2003 |
| JP | 2007203454 A | 8/2007 |
| JP | 2008183703 A | 8/2008 |
| JP | 2008207283 A | 9/2008 |
| JP | 2009262277 | 11/2009 |
| JP | 2009262319 A | 11/2009 |
| JP | 2010528890 A | 8/2010 |
| JP | 4627849 | 2/2011 |
| JP | 2012-143866 A | 8/2012 |
| JP | 2012143806 | 8/2012 |
| JP | 2012525271 | 10/2012 |
| WO | 9313899 | 7/1993 |
| WO | 03-099494 A1 | 12/2003 |
| WO | 03099495 | 12/2003 |
| WO | 2010-126693 A1 | 11/2010 |
| WO | WO2011111197 A1 | 9/2011 |
| WO | 2013016018 | 1/2013 |
| WO | 2014116571 | 7/2014 |

OTHER PUBLICATIONS

May 20, 2016 Notice of Allowance.
JP2000061719 Machine Translation.
Jun. 1, 2016—Second Office Action—CN Application No. 2012102520406.
Jul. 12, 2016—First Office Action.
Nov. 3, 2016 Office action (3 months).
Nov. 7, 2016 Final Office Action.
Dec. 2, 2016 Third Office Action.
Dec. 11, 2014—Non-Final_Rejection-1.
Sep. 26, 2013—Examination Request.
Nov. 20, 2015 Final Office Action.
Apr. 10, 2015 Office action (3 months) 1 US20130315684.

(56) References Cited

OTHER PUBLICATIONS

Jun. 8, 2015 Final Office Action 20130022422.
Advisory Action.
Sep. 29, 2015 First office action.
Oct. 27, 2015 Notice of Allowance.
Korean Intellectual Property Office, "International Search Report for PCT/US2014/012282", dated Apr. 28, 2014, 3 pp.
Mar. 7, 2017 First office action.
May 11, 2017 Final Office Action.
May 24, 2017 Office action (3 months).

* cited by examiner

INDEXABLE DRILL INSERT AND ROTARY CUTTING TOOL EMPLOYING SAME

BACKGROUND

Field of the Invention

Embodiments of the present disclosure relate to a drill insert, more particularly embodiments relate to an indexible drill insert for use in a pocket of a drill body. Embodiments of the present disclosure also relate to a rotary cutting tool employing such an insert.

Background Information

Drilling tools are used to form cylindrical holes in workpieces formed from metals and other hard materials. The cutting or boring action of the drilling tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, such as a chuck mechanism of a machine tool, which rotates the tool holder about its longitudinal axis. At the opposite end of the elongated tool holder, the cutting insert engages the workpiece material to be machined. Alternatively, the workpiece may be made to rotate relative to the holder and cutting insert, such as in positioning the holder in the tail stock of a lathe or the like. Further, the tool holder and workpiece may both be made to rotate relative to one another. The use of replaceable cutting inserts allows for quick changing of the insert upon wear of the cutting surfaces instead of the entire tool, and allows for one tool to be used for a variety of different boring applications by simply changing the insert and not the entire drill assembly.

The indexible drill inserts plays an important role in drilling because typically multiple sides of an insert can be used for cutting one after the other. Further, use of inserts generally reduces manufacturing lead time and assembling time.

The use of quadra angular indexible drill inserts is known in the art, however, the inserts which are in the art comprise four rectangular cutting edges for cutting the workpiece. The use of rectangular cutting edges tends to make the drill drift away from its center because the cutting forces act generally all over the drill body and not exactly at the center. The drill drift further creates a narrow wall which is not feasible in practical applications. Further, conventional indexible drill inserts rub the surface of the drilling hole if the diameter of the drill hole is less than the predetermined value.

In the view of above mentioned disadvantages, it is necessary to develop an improved drill insert having four identical cutting edges.

SUMMARY OF THE INVENTION

Shortcomings of the prior art are overcome and additional advantages are provided through the provision of an indexable insert. The insert includes a top surface; a bottom surface; a side surface extending between the top and bottom surfaces from multiple sides of the insert; a central mounting aperture extending between the top surface and the bottom surface; and a plurality of identical cutting edges disposed at the intersection of the top surface and the side surface. Each cutting edge includes a first part edge disposed tangent to a first reference circle aligned about the central mounting aperture; a second part edge extending from the first part edge, the second part edge being connected to the first part edge via a convex curved portion; a third part edge disposed tangent to a second reference circle aligned about the central mounting aperture, the second reference circle having a smaller diameter than the first reference circle, the third part edge being connected to the second part edge via a concave curved portion; and a convexly curved corner portion extending from the third part edge of one of the identical cutting edges to the first part edge of another one of the identical cutting edges.

The insert may be a quadrangular indexible insert having four identical cutting edges.

The first part edge may be disposed at a first inclination angle with respect to a reference plane passing through the center of the mounting aperture, the second part edge may be disposed at a second inclination angle with respect to the reference plane, the third part edge may be disposed at a third inclination angle with respect to the reference plane, and the second inclination angle may be greater than the first inclination angle which is greater than the third inclination angle.

The first inclination angle may be in the range of about 10° to about 20° and may be about 15°. The second inclination angle may be in the range of about 40° to about 48° and may be about 42°. The third inclination angle may be in the range of about 8° to about 14° and may be about 10°.

The first part edge and the second part edge may be disposed at an angle of about 123° with respect to each other. The second part edge and the third part edge may be disposed at an angle of about 32° with respect to each other.

Shortcomings of the prior art are overcome and additional advantages are also provided through the provision of a drill having a drill body disposed about a longitudinal axis. The drill body includes a first end and an opposite second end. The first end is adapted to be disposed in a machine tool and the opposite second end includes a first pocket formed therein generally at or about the longitudinal axis. The drill further includes an indexable insert as described above disposed in the first pocket.

The first pocket may be disposed at or about the longitudinal axis.

The convex curved portion of the insert may be the axially forwardmost portion of the drill.

At least a portion of the first part edge of the insert may be disposed axially forward of any portion of the third part edge of the insert.

The first part edge of the insert may be disposed closer to the longitudinal axis than the third part edge of the insert.

The first part edge of the insert may be disposed at an angle in the range of about 50° to about 90° with respect to the longitudinal axis. The first part edge of the insert may be disposed at an angle of about 75° with respect to the longitudinal axis.

The opposite second end may further include a second pocket disposed away from the longitudinal axis, the second pocket having a second insert different from the quadrangular indexable insert disposed therein.

At least portions of each of the first part edge and the third part edge of the insert are disposed axially forward of any portion of the second insert.

Shortcomings of the prior art are overcome and additional advantages are also provided through the provision of a drill body which includes a body portion disposed about a longitudinal axis, the body portion having a first end and an opposite second end, the first end being adapted to be disposed in a machine tool; and a pocket formed in the opposite second end, the pocket being adapted to house an insert as described above.

The pocket may be structured to secure the insert therein in a manner such that the first part edge of the insert is disposed at an angle in the range of about 50° to about 90° with respect to the longitudinal axis.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

Novel features and characteristics of the disclosure are set forth in the appended claims. The disclosure itself, however, as well as an example mode of use, further objectives and advantages thereof will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION OF EXEMPLARY EMBODIMENTS

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
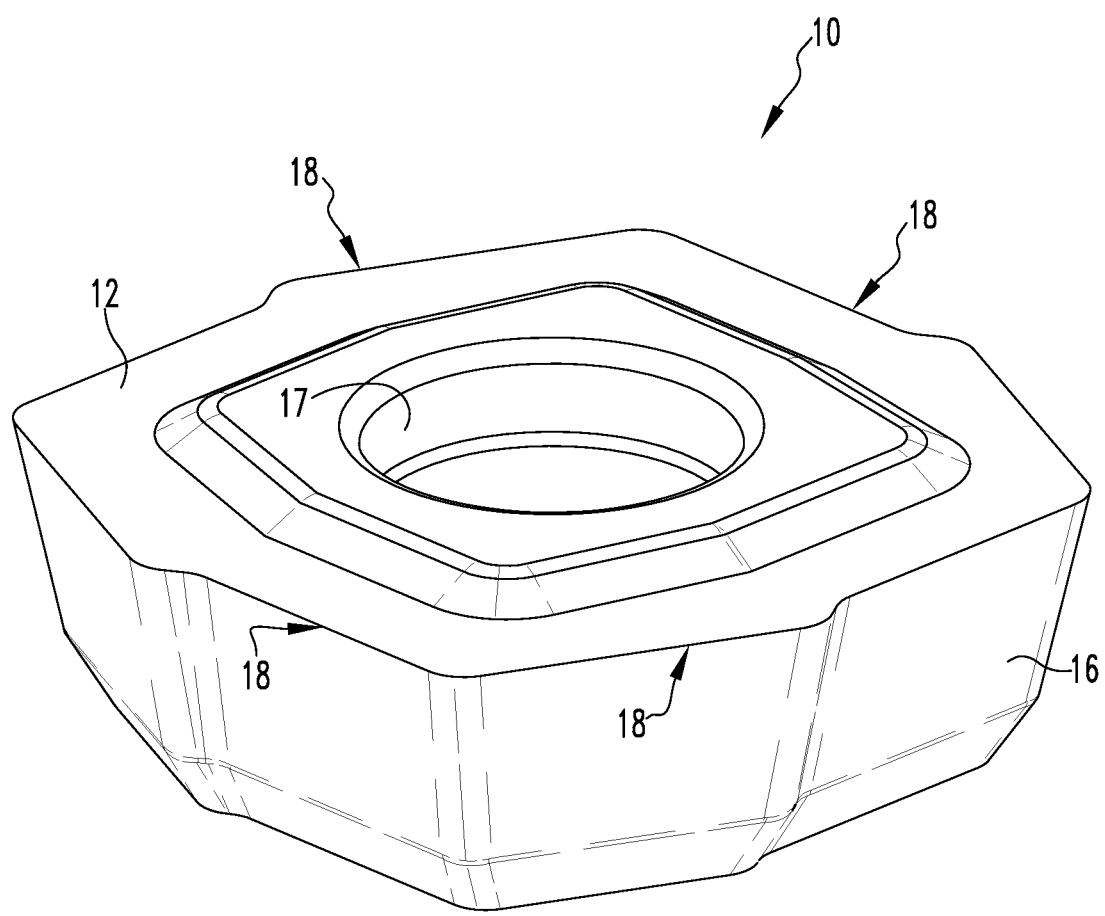
FIG. 1 illustrates an isometric view of the top and sides of a drill insert in accordance with an embodiment of the present disclosure.
Figure 2:
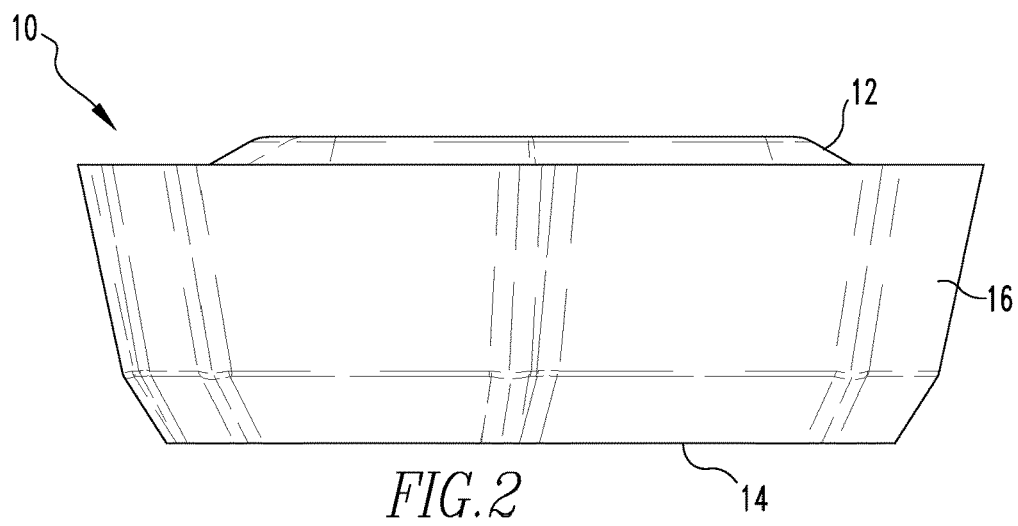
FIG. 2 illustrates a side view of the drill insert of FIG. 1.

FIGS. 1-4 illustrate an example embodiment of an insert 10 in accordance with the present invention. Referring to FIGS. 1 and 2, insert 10 includes a top surface 12, a bottom surface 14 (FIG. 2), and a side surface 16 which extends around the periphery of the insert 10 and extends between the top and bottom surfaces 12 and 14. As perhaps best appreciated from FIG. 2, the top surface 12 of drill insert 10 is bigger than the bottom surface 14. Such arrangement provides positive clearance between the insert 10 and the associated pocket of a drill body, as will be discussed in greater detail below. Insert 10 further includes a mounting aperture 17 disposed about the center of the insert which extends between the top surface 12 and the bottom surface 14. Mounting aperture 17 is adapted to receive a coupling screw (not shown) for coupling the insert 10 to a tool body (not shown), as will be discussed further below.

Figure 3:
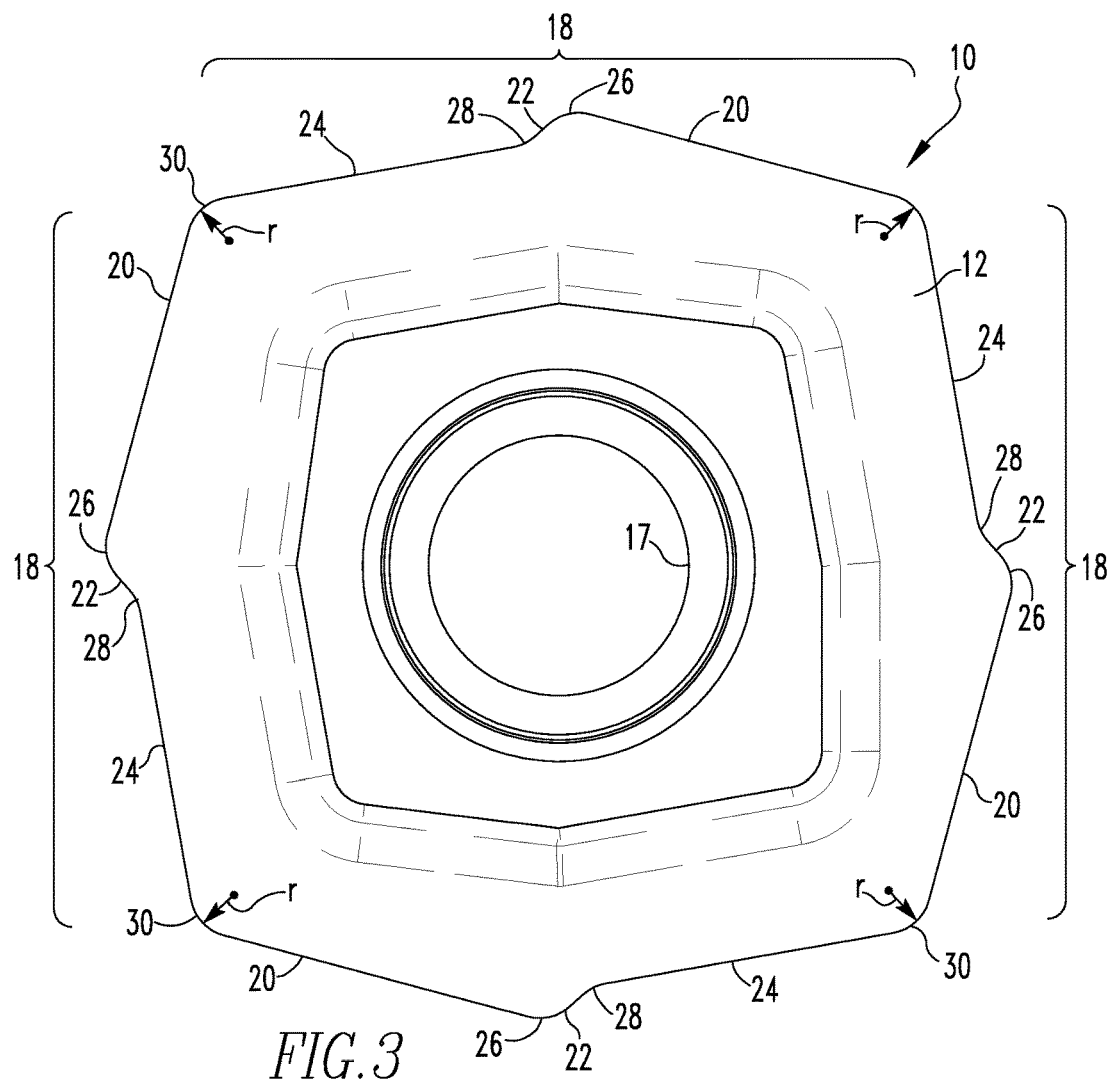
FIG. 3 illustrates a top view of the drill insert of FIG. 1.

The insert 10 further includes a plurality of cutting sides or edges 18 formed at the intersection of the top surface 12 and the side surface 16. Each of the cutting edges 18 are adapted to perform cutting operations on a workpiece (not shown) when positioned accordingly in a drill body, as will be discussed in greater detail below. The example insert 10 illustrated in FIGS. 1-4 includes four identical cutting sides or edges 18 disposed on the four sides of the quadrangular insert. As shown in FIG. 3, each cutting edge 18 (only three of the four cutting edges 18 are labeled in FIG. 3) is divided into plurality of linear part edges, more particularly each cutting edge is divided into a first part edge 20, a second part edge 22 and a third part edge 24.

Referring to the top views of FIGS. 3 and 4, the arrangement of one cutting edge 18 will now be described. As each cutting edge 18 is identical, only the arrangement of one such cutting edge 18 provided.

First part edge 20 is disposed tangent to a reference circle $C_1$ aligned about the mounting aperture 17 and at a first inclination angle $\alpha_1$ with respect to a reference plane P passing through the center of the mounting aperture 17 generally parallel to the cutting edge 18 of which the aforementioned first part edge 20 is a portion. First part edge 20 may be disposed at a first inclination angle $\alpha_1$ in the range of about 10° to about 20°. In the example embodiment illustrated in FIG. 4, the first part edge 20 is disposed at a first inclination angle $\alpha_1$ of about 15°.

Second part edge 22 extends from first part edge 20 and is connected thereto via a convex curved portion 26. Second part edge 22 is disposed at a second inclination angle $\alpha_2$ with respect to the reference plane P. Second part edge 22 may be disposed at a second inclination angle $\alpha_2$ in the range of about 40° to about 48°. In the example embodiment illustrated in FIG. 4, second part edge 22 is disposed at a second inclination angle $\alpha_2$ of about 42° and thus is disposed at an angle (not labeled) of about 123° with respect to first part edge 20.

Third part edge 24 is disposed tangent to a second reference circle $C_2$, of smaller diameter than first reference circle $C_1$, aligned about the mounting aperture 17. Third part edge 24 extends away from second part edge 22 and is connected thereto via a concave curved portion 28. Third part edge 24 is disposed at a third inclination angle $\alpha_3$ with respect to the reference plane P. Third part edge 24 may be disposed at a third inclination angle $\alpha_3$ in the range of about 8° to about 14°. In the example embodiment illustrated in FIG. 4, third part edge 24 is disposed at a third inclination angle $\alpha_3$ of about 10° and thus is disposed at an angle (not labeled) of about 32° with respect to second part edge 22.

Figure 4:
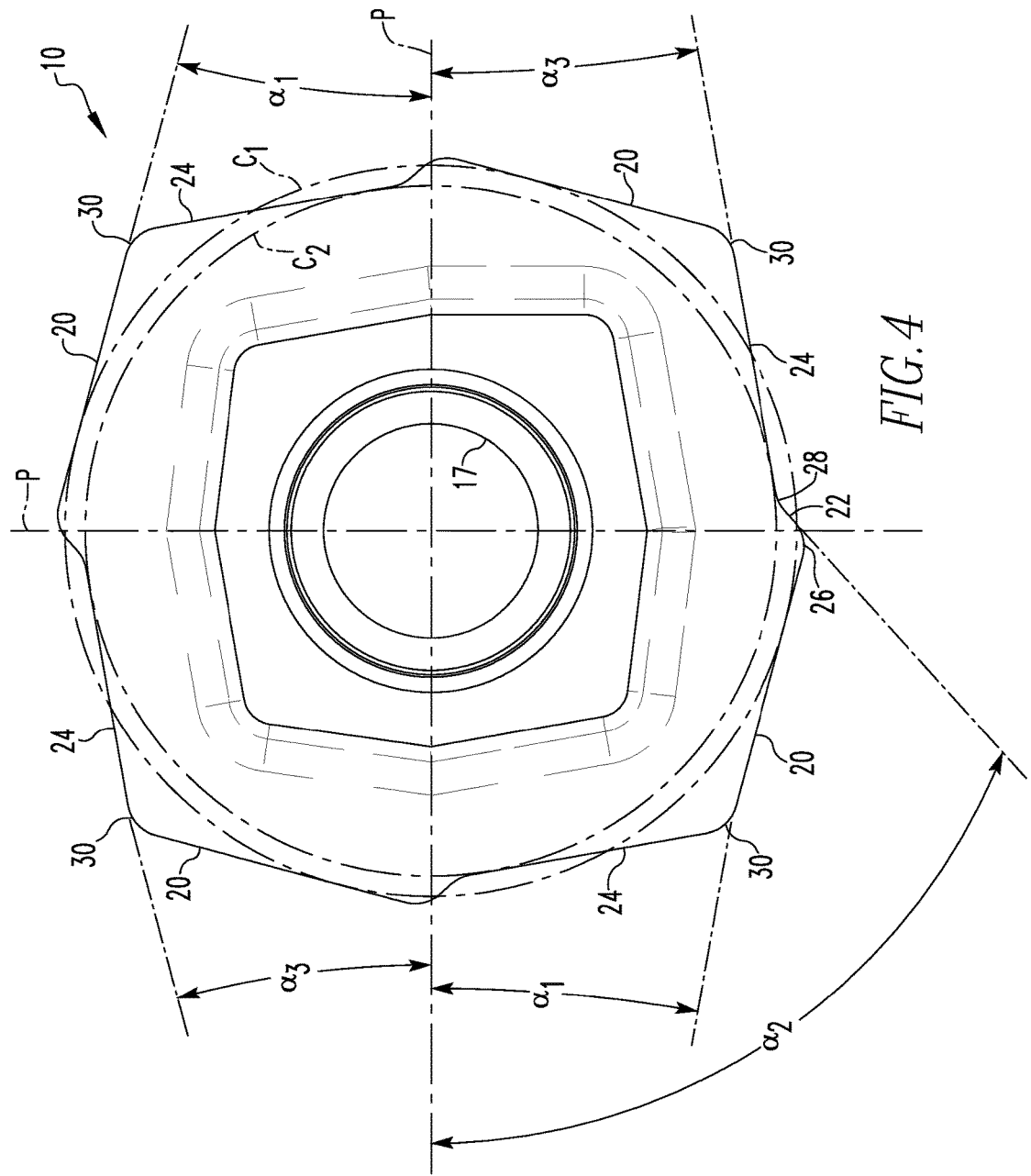
FIG. 4 illustrates another top view of the drill insert of FIG. 1.

Continuing to refer to FIGS. 3 and 4, each cutting edge 18 includes, and is connected to an adjacent cutting edge 18 by, a convexly curved corner portion 30. More particularly, each convexly curved corner portion 30 extends from the third part edge 24 of one cutting edge 18 to the first part edge 20 of an adjacent cutting edge 18. Each convexly curved portion 30 is generally defined by a radius r (FIG. 3) which is generally in the range of about 0.2 mm to about 2.0 mm, depending on the overall size of the insert 10.

It is to be appreciated that the relative lengths of the part edges 20, 22 and 24 may be somewhat varied without varying from the scope of the invention, however, convex curved portion 26 is preferably disposed at or on either side of the center line of the insert, preferably within 10% of the overall length of cutting edge 18 on either side of center line.

Figure 5:
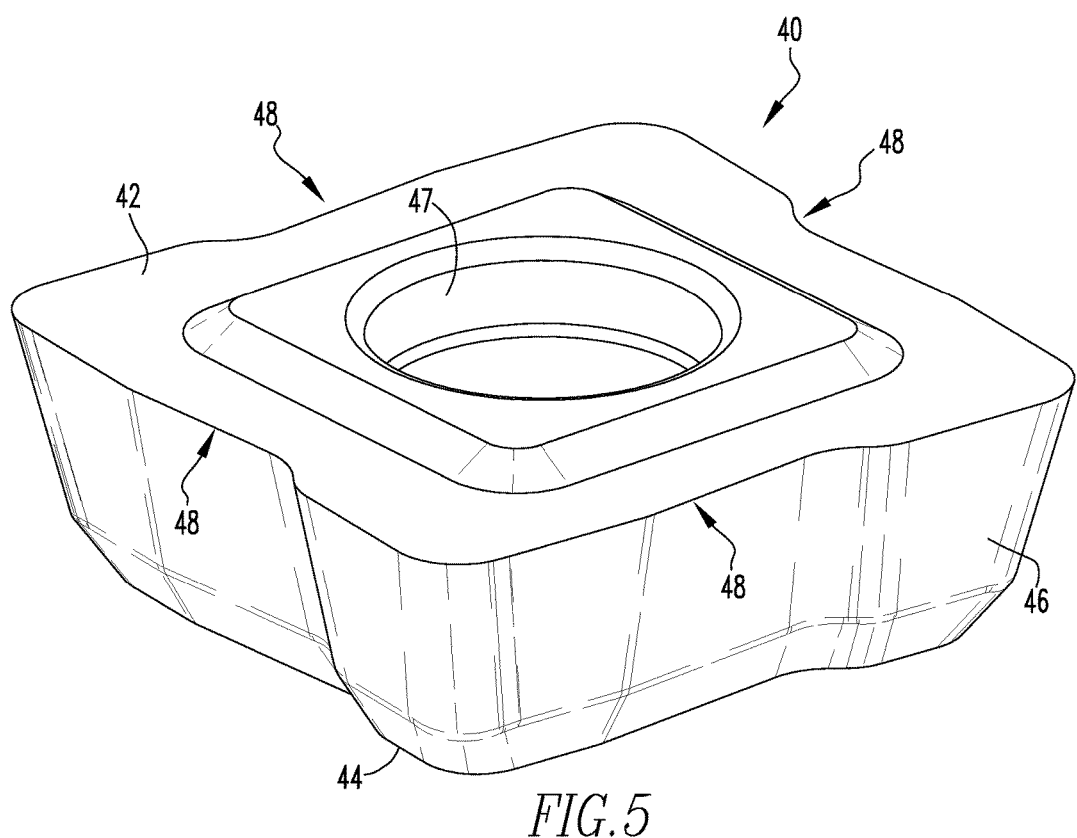
FIG. 5 illustrates an isometric view of the top and sides of a drill insert in accordance with another embodiment of the present disclosure.
Figure 6:
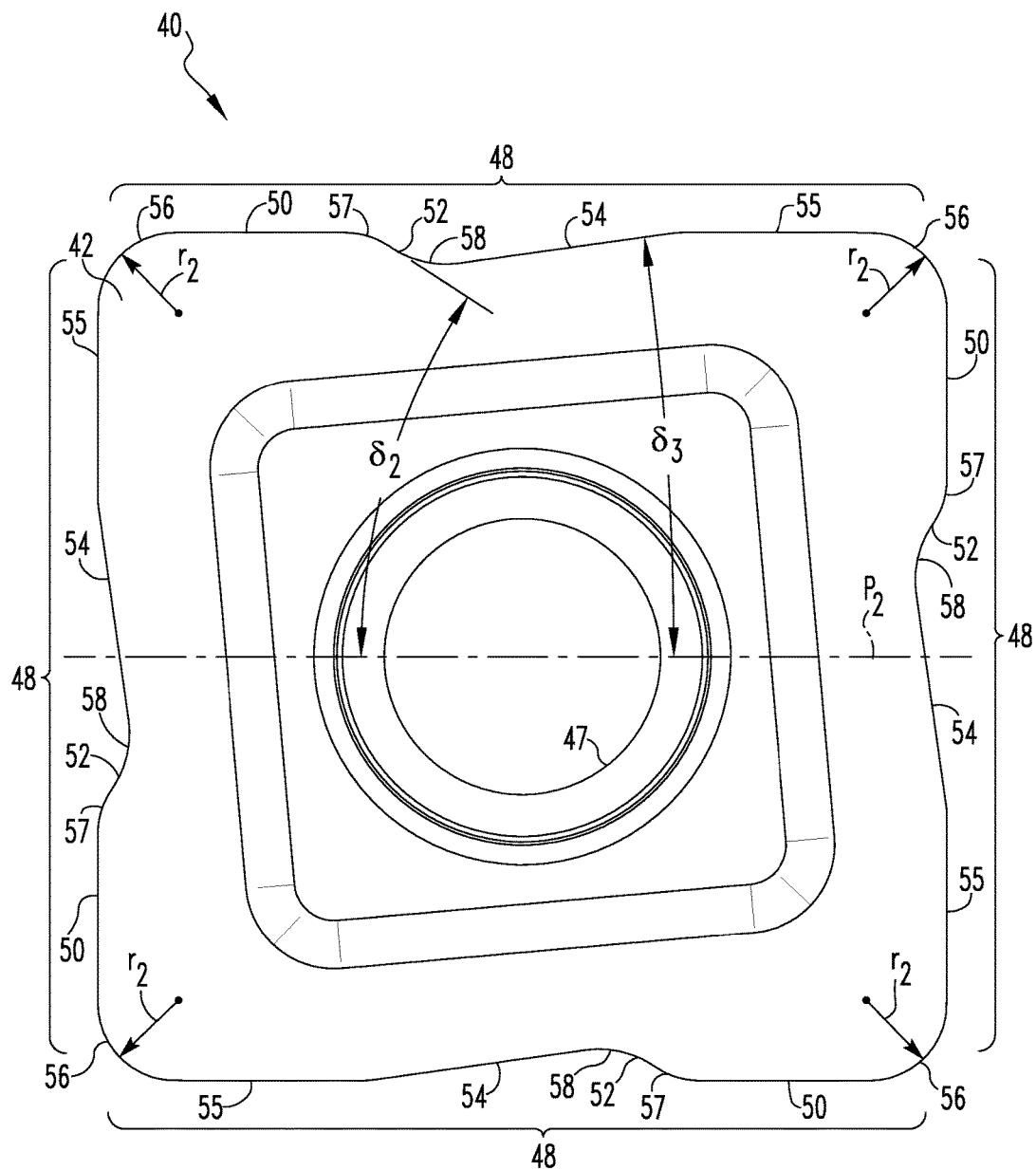
FIG. 6 illustrates a top view of the drill insert of FIG. 5.
Figure 7:
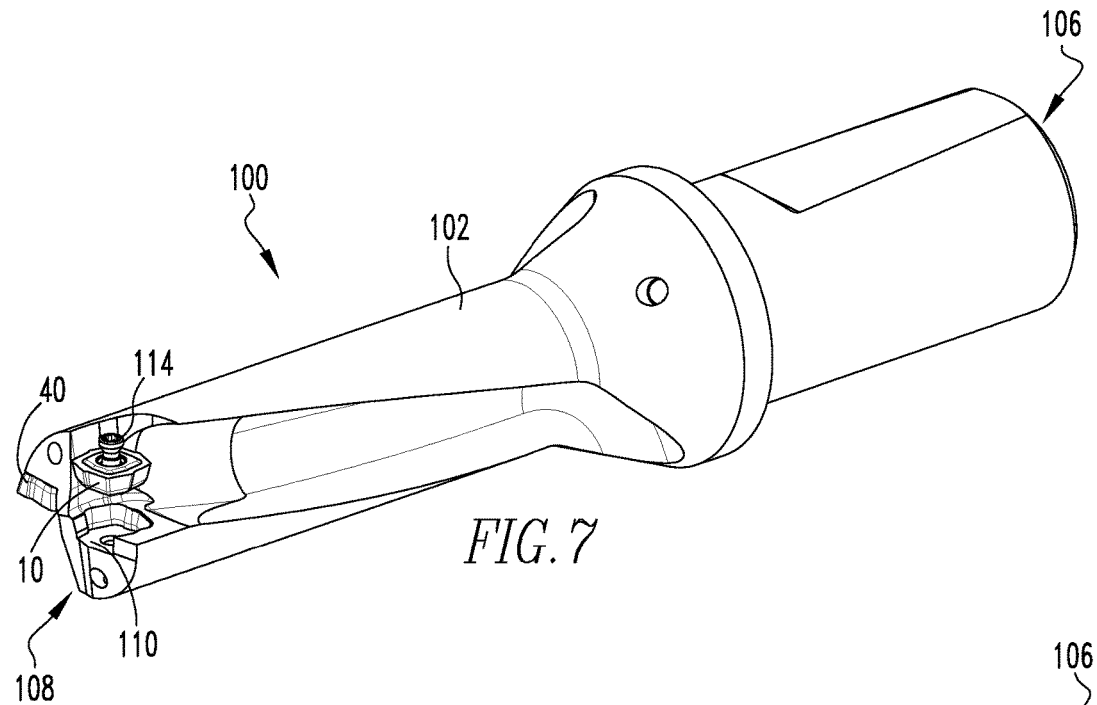
FIG. 7 illustrates a partially exploded isometric view of a drill body in accordance with an embodiment of the present disclosure having the drill insert of FIGS. 1-4 disposed exploded from an inner pocket and the insert of FIGS. 5 and 6 disposed in a peripheral pocket.

FIGS. 5 and 6 illustrate another example embodiment of an insert 40 in accordance with the present invention. Insert 40 includes a top surface 42, a bottom surface 44, and a side surface 46 which extends around the periphery of the insert 40 between the top and bottom surfaces 42 and 44. As shown in FIG. 5, the top surface 42 of drill insert 40 is bigger than the bottom surface 44. Such arrangement provides positive clearance between the insert 40 and the associated pocket of a drill body, as will be discussed in greater detail below. Insert 40 further includes a mounting aperture 47 disposed about the center of the insert 40 which extends between the top surface 42 and the bottom surface 44. Mounting aperture 47 is adapted to receive a coupling screw (not shown) for coupling the insert 40 to a tool body (not shown), as will be discussed further below.

The insert 40 further includes a plurality of cutting sides or edges 48 formed at the intersection of the top surface 42 and the side surface 46. Each of the cutting edges 48 are adapted to perform cutting operations on a workpiece (not shown) when positioned accordingly in a drill body, as will be discussed in greater detail below. The example insert 40 illustrated in FIGS. 5 and 6 includes four identical cutting sides or edges 48 disposed on the four sides of the quadrangular insert. As shown in FIG. 6, each cutting edge 48 is divided into plurality of linear part edges, more particularly each cutting edge is divided into a first part edge 50, a second part edge 52, a third part edge 54 and a fourth part edge 55.

Continuing to refer to the top view of FIG. 6, the arrangement of one cutting edge 48 will now be described. As each cutting edge 48 is identical, only the arrangement of one such cutting edge 48 provided.

First part edge 50 extends from a corner 56 of the insert 40 and is disposed generally parallel to an imaginary reference plane $P_2$ which passes through the center of the insert 40. Each corner 56 is generally defined by a radius $r_2$ which is generally in the range of about 0.2 mm to about 2.0 mm, depending on the overall size of the insert 40.

Second part edge 52 extends from first part edge 50 in a direction toward the reference plane $P_2$ and is connected thereto via a convex curved portion 57. Second part edge 52 may be disposed at an angle $\delta_2$ in the range of about 32° to about 40° with respect to reference plane $P_2$. In the example embodiment illustrated in FIG. 6, second part edge 52 is disposed at an angle $\delta_2$ of about 33° with respect to reference plane $P_2$ and thus is disposed at an angle (not labeled) of about 147° with respect to first part edge 50.

Third part edge 54 extends from second part edge 52 in a direction also away from reference plane $P_2$. Third part edge 54 is connected to second part edge 52 via a concave curved portion 58. Third part edge 54 may be disposed at an angle $\delta_3$ in the range of about 6° to about 12° with respect to reference plane $P_2$. In the example embodiment illustrated in FIG. 6, third part edge 54 is disposed at an angle $\delta_3$ of about 8° with respect to reference plane $P_2$ and thus is disposed at an angle (not labeled) of about 139° with respect to second part edge 52.

Fourth part edge 55 extends from third part edge 54 toward another corner 56 of the insert 40 and, similar to first part edge 50, is disposed generally parallel to reference plane $P_2$.

It is to be appreciated that the lengths of the part edges 50, 52, 54 and 55 may be varied without varying from the scope of the present invention, however, in at least one example embodiment the length of the first part edge 50 is approximately one third the length of the cutting edge 48 and approximately equal in length to the fourth part edges 55. In such example embodiment, third part edge 54 is less than both the first and first and fourth part edges 50 and 55.

Figure 8:
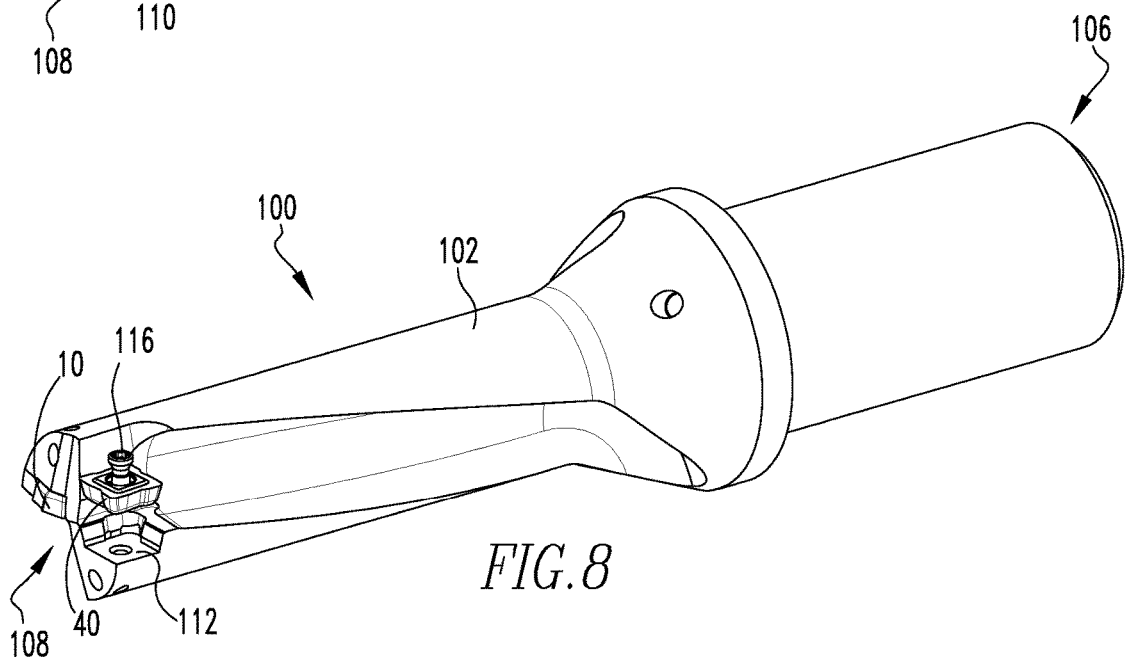
FIG. 8 illustrates a partially exploded isometric view of the drill body of FIG. 7 having the drill insert of FIGS. 5 and 6 disposed exploded from a peripheral pocket and the insert of FIGS. 1-4 disposed in an inner pocket.

Having thus described inserts in accordance with example embodiments of the present invention, an example embodiment of a drill 100 including such inserts 10 and 40 disposed in a drill body 102 is shown in FIGS. 7-11. Drill body 102 is disposed about a central longitudinal axis 104 (FIGS. 9-11) and includes a first end 106 and an opposite second end 108. First end 106 is adapted to be disposed in a machine tool (not shown) which is adapted to rotate the drill body 102 about longitudinal axis 104. The opposite second end 108 includes a first, central pocket 110 (FIG. 7) formed therein generally at or about the longitudinal axis 104 and a second, peripheral pocket 112 (FIG. 8). Central pocket 110 is adapted to receive and securely couple therein, via a setscrew 114, the insert 10, as previously described in conjunction with FIGS. 1-4. Similarly, peripheral pocket 112 is adapted to receive and securely couple therein, via another setscrew 116, the insert 40, as previously described in conjunction with FIGS. 5 and 6.

Figure 9:
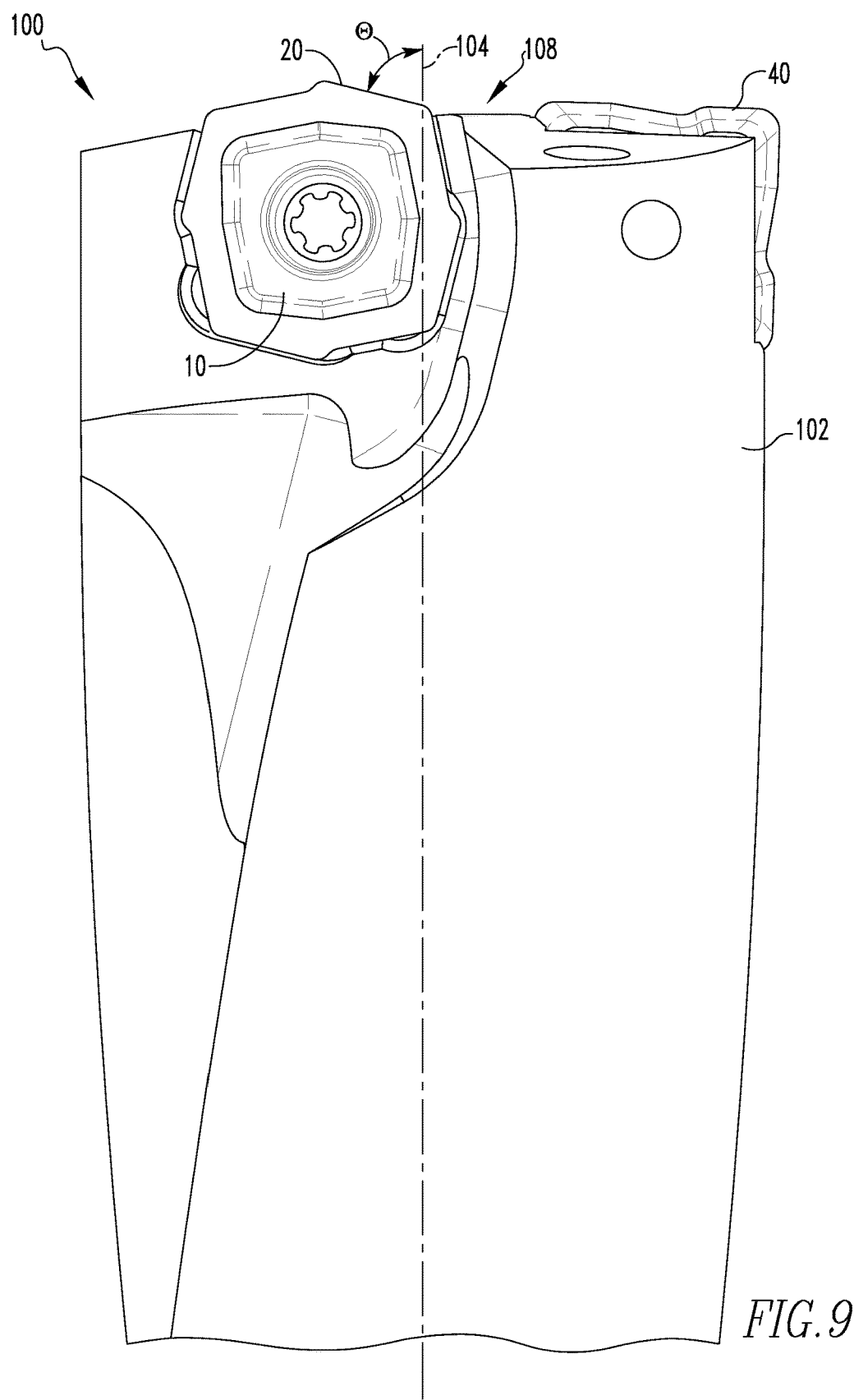
FIG. 9 illustrates an elevation view of an end of the drill body of FIGS. 7 and 8 showing details of the mounting of the drill insert of FIGS. 1-4 with respect to the drill body.

As shown in the detail elevation view of FIG. 9, insert 10 is secured in the central pocket 110 such that the first part edge 20 is disposed closest to, and forms an angle θ with regard to the longitudinal axis 104. In the example embodiment shown in FIGS. 7-11, the first part edge 20 is disposed at an angle θ of about 75° with respect to the longitudinal axis 104, however the angle θ may be varied in the range of about 50° to about 90° with respect to the longitudinal axis 104 as the radial position of the outer insert is changed to accommodate a smaller or larger diameter of the drill 100 for the same set of inserts.

Figure 10:
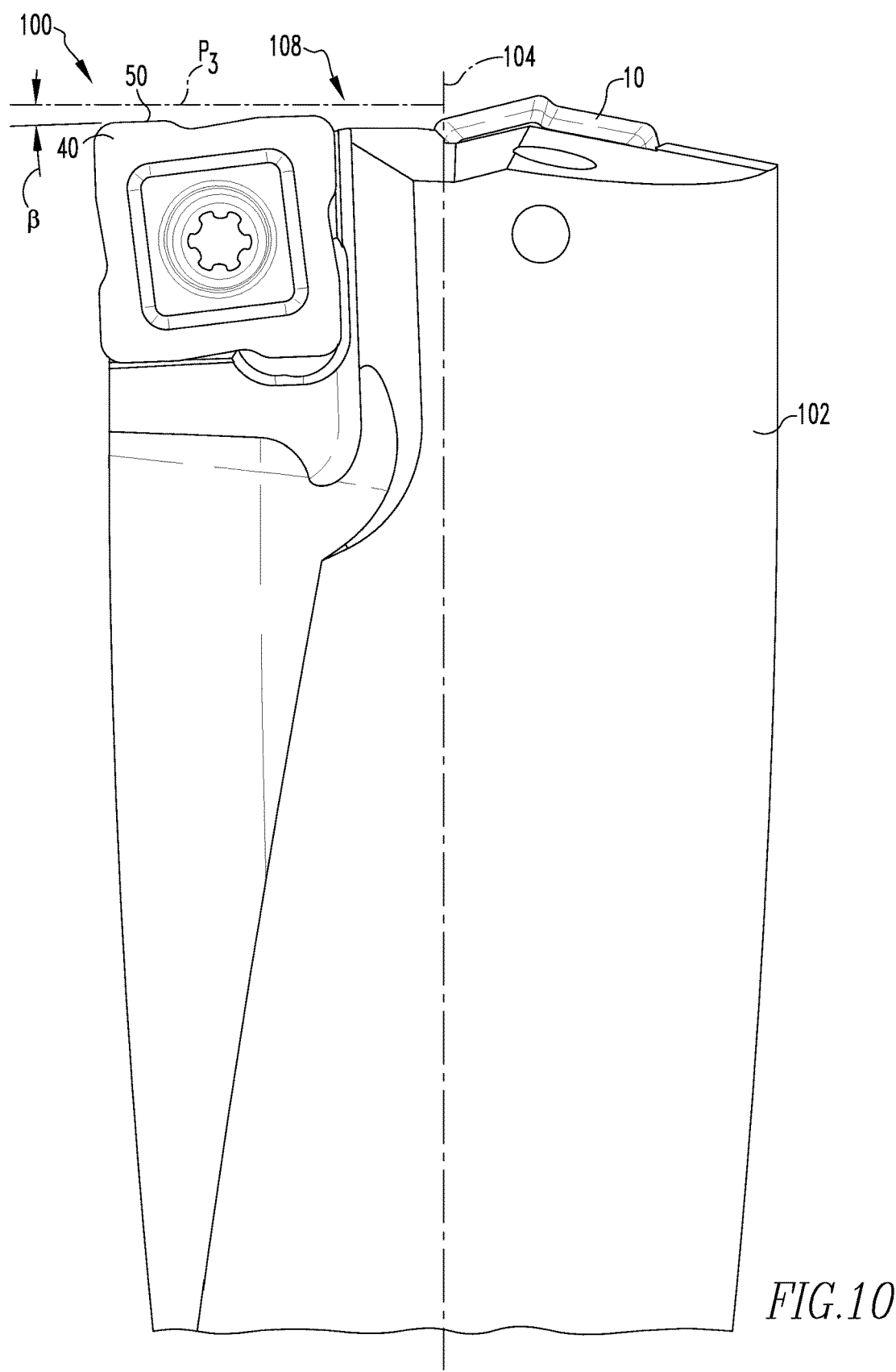
FIG. 10 illustrates an elevation view of an end of the drill body of FIGS. 7 and 8 showing details of the mounting of the drill insert of FIGS. 5 and 6 with respect to the drill body.

As shown in the detail elevation view of FIG. 10, insert 40 is secured in the peripheral pocket 112 such that the first part edge 50 is disposed furthest from, and forms an angle β with regard a reference plane P₃ disposed perpendicular to the longitudinal axis 104. In the example embodiment shown in FIGS. 7-11, the first part edge 50 is disposed at an angle β of about 2° with respect to the reference plane P₃ or about 92° with respect to the longitudinal axis 104. In other embodiments of the invention, the first part edge 50 may be disposed in a range of positions from being generally perpendicular to the longitudinal axis 104 (i.e., β is about 0°) to being disposed at an angle β of about 10° (i.e., part edge 50 may vary from about 90° to about 100° with respect to longitudinal axis 104).

Figure 11:
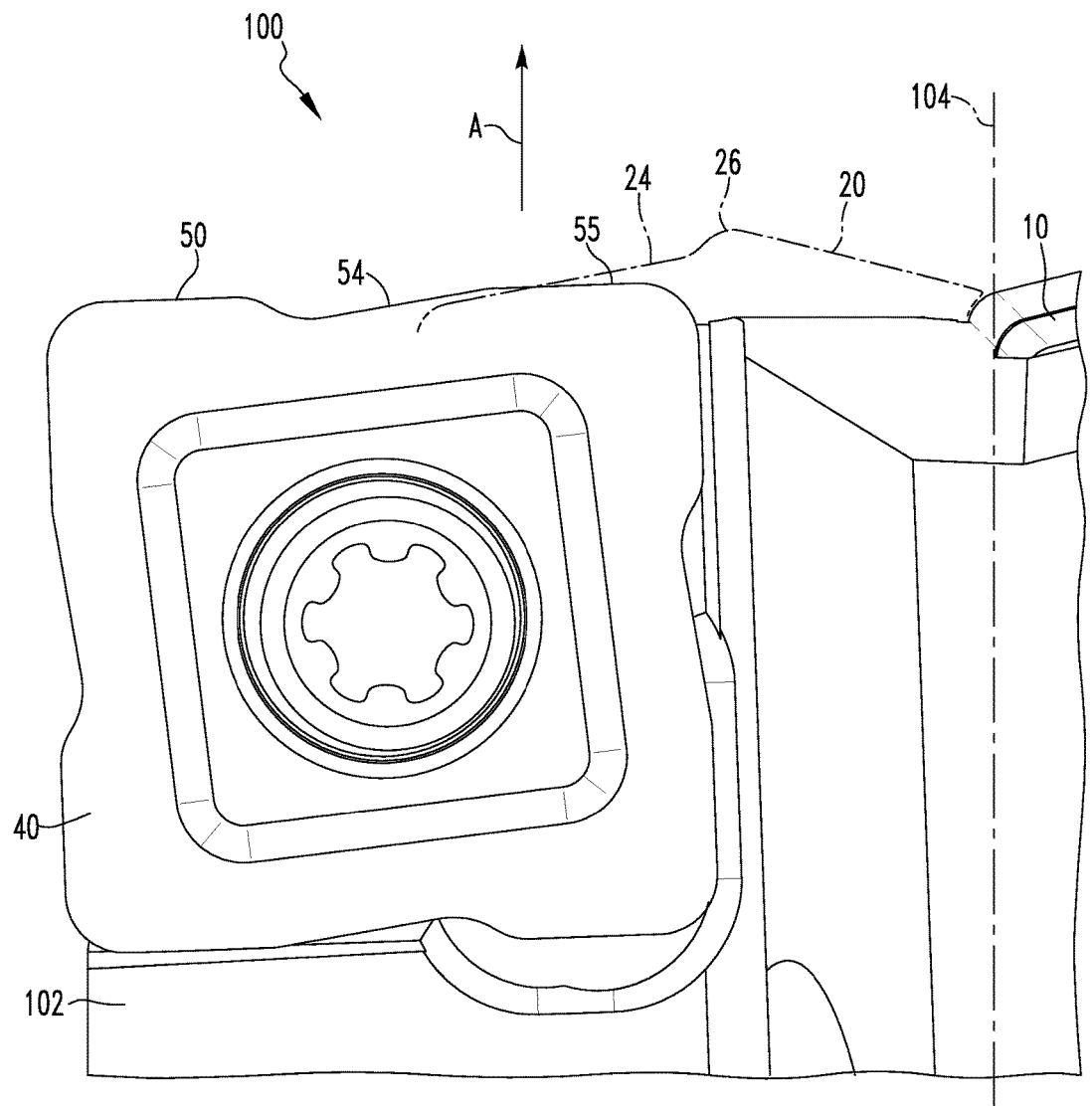
FIG. 11 illustrates a detail view of a portion of the elevation view of FIG. 10 with the forward profile of the cutting insert from FIGS. 1-4 shown rotated approximately 180° about the longitudinal axis to show the axial relationship of such insert with the insert disposed in the peripheral pocket.

Having thus described the relative positioning of each of inserts 10 and 40 with respect to the drill body 102, the relative axial positioning of each of inserts 10 and 40 with respect to each other will now be described in conjunction with the detail view of FIG. 11, which shows (in phantom) the leading cutting edge of insert 10 revolved approximately 180° about the longitudinal axis 104. In general, the leading cutting edge of insert 10 (shown in phantom) is disposed axially forward (i.e., further from opposite second end 108 of drill body 102) than the leading cutting edge of insert 40. More particularly, insert 10 is disposed such that when drill 100, and thus drill body 102, is advanced axially along longitudinal axis 104 toward a workpiece (not shown) such as shown by arrow A in FIG. 11, or alternatively the workpiece is advanced toward the drill 100, convex curved portion 26 of insert 10 is the first part of either insert 10 or 40 to contact the workpiece. Next, first part edge 20 of insert 10 begins to contact and machine the workpiece.

As the drill 100 is further advanced toward the workpiece, the third part edge 24 of insert 10 begins to contact and machine the workpiece. As the drill 100 is further advanced, the cutting edge 48 (FIG. 6) of the peripheral insert 40 begins to contact the workpiece, first at its fourth part edge 55, and then subsequently at its third part edge 54 and then finally at first part edge 50.

In addition to novel aspects of the present invention previously described, it is to be appreciated from the views of FIGS. 1, 2 and 5 that the respective side surfaces 16 and 46 of each of the example inserts 10 and 40 are provided with dual clearance angles (i.e., one angle near the respective top surface and a different angle near the bottom surface). Such dual clearance angles provide for greater clearances at the outer periphery of the drill body 102 (in regard to the peripheral insert) as well as prevent the central portion of the drill from rubbing or toughing the workpiece at higher feed rates.

It is to be appreciated that the present disclosure provides a quadra angular indexible drill insert in which all four cutting edges may be used for drilling, i.e. when one edge wears out the subsequent edge can be used for cutting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. An indexable insert comprising:
   a top surface;
   a bottom surface;
   a side surface extending between the top and bottom surfaces from multiple sides of the insert;
   a central mounting aperture extending between the top surface and the bottom surface; and
   a plurality of identical cutting edges disposed at the intersection of the top surface and the side surface, each cutting edge comprising:
   a first part edge disposed tangent to a first reference circle aligned about the central mounting aperture;
   a second part edge extending from the first part edge, the second part edge being connected to the first part edge via a convex curved portion;
   a third part edge disposed tangent to a second reference circle aligned about the central mounting aperture, the second reference circle having a smaller diameter than the first reference circle, the third part edge being connected to the second part edge via a concave curved portion; and a convexly curved corner portion extending from the third part edge of one of the identical cutting edges to the first part edge of another one of the identical cutting edges, wherein:

the insert is a quadrangular indexable insert and the plurality of identical cutting edges comprises four cutting edges, the first part edge is disposed at a first inclination angle with respect to a reference plane passing through the center of the mounting aperture, the second part edge is disposed at a second inclination angle with respect to the reference plane, the third part edge is disposed at a third inclination angle with respect to the reference plane, the second inclination angle is greater than the first inclination angle which is greater than the third inclination angle, and the second inclination angle is in the range of about 40° to about 48°.

2. The insert of claim 1 wherein the first inclination angle is in the range of about 10° to about 20°.

3. The insert of claim 2 wherein the third inclination angle is in the range of about 8° to about 14°.

4. The insert of claim 1 wherein the third inclination angle is in the range of about 8° to about 14°.

5. The insert of claim 1 wherein:
the first inclination angle is about 15°,
the second inclination angle is about 42°, and
the third inclination angle is about 10°.

6. The insert of claim 1 wherein the first part edge and the second part edge are disposed at an angle of about 123° with respect to each other.

7. The insert of claim 1 wherein the second part edge and the third part edge are disposed at an angle of about 32° with respect to each other.

8. A drill body comprising:
a body portion disposed about a longitudinal axis, the body portion having a first end and an opposite second end, the first end being adapted to be disposed in a machine tool; and
a pocket formed in the opposite second end, the pocket being adapted to house an insert-therein such as recited in claim 1.

9. A drill comprising:
a drill body disposed about a longitudinal axis, the drill body having a first end and an opposite second end, the first end being adapted to be disposed in a machine tool and the opposite second end having a first pocket formed therein generally at or about the longitudinal axis; and
an indexable insert disposed in the first pocket, the indexable insert comprising:
a top surface;
a bottom surface;
a side surface extending between the top and bottom surfaces from multiple sides of the insert;
a central mounting aperture extending between the top surface and the bottom surface; and
a plurality of identical cutting edges disposed at the intersection of the top surface and the side surface, each cutting edge comprising:
a first part edge disposed tangent to a first reference circle aligned about the central mounting aperture;
a second part edge extending from the first part edge, the second part edge being connected to the first part edge via a convex curved portion;
a third part edge disposed tangent to a second reference circle aligned about the central mounting aperture, the second reference circle having a smaller diameter than the first reference circle, the third part edge being connected to the second part edge via a concave curved portion; and
a convexly curved corner portion extending from the third part edge of one of the identical cutting edges to the first part edge of another one of the identical cutting edges,
wherein the insert is a quadrangular indexable insert and the plurality of identical cutting edges comprises four cutting edges;
wherein the convex curved portion of the insert is the axially fowardmost portion of the drill; and
wherein the first part edge of the insert is disposed at an angle in the range of about 50° to about 90° with respect to the longitudinal axis.

10. The drill of claim 9 wherein the first pocket is disposed at or about the longitudinal axis.

11. The drill of claim 9 wherein at least a portion of the first part edge of the insert is disposed axially forward of any portion of the third part edge of the insert.

12. The drill of claim 9 wherein the first part edge of the insert is disposed closer to the longitudinal axis than the third part edge of the insert.

13. The drill of claim 9 wherein the first part edge of the insert is disposed at an angle of about 75° with respect to the longitudinal axis.

14. The drill of claim 9 wherein the opposite second end further includes a second pocket disposed away from the longitudinal axis, the second pocket having a second, structurally different insert different from the quadrangular indexable insert disposed therein.

15. The drill of claim 14 wherein at least portions of each of the first part edge and the third part edge of the insert are disposed axially forward of any portion of the second insert.

16. The drill body of claim 15 wherein the pocket is structured to secure the insert therein in a manner such that the first part edge of the insert is disposed at an angle in the range of about 50° to about 90° with respect to the longitudinal axis.

* * * * *